United States Patent [19]

Crowe

[11] 4,426,296

[45] Jan. 17, 1984

[54] METHOD OF ACIDIZING WELLS USING GELLED ACIDS

[75] Inventor: Curtis W. Crowe, Tulsa County, Okla.

[73] Assignee: The Dow Chemical Company, Midland, Mich.

[21] Appl. No.: 310,932

[22] Filed: Oct. 13, 1981

[51] Int. Cl.$^3$ .............................................. E21B 43/27
[52] U.S. Cl. .............................. 252/8.55 C; 166/307; 252/363.5
[58] Field of Search ....................... 252/8.55 C, 363.5; 166/307

[56] References Cited

U.S. PATENT DOCUMENTS

| | | | |
|---|---|---|---|
| 3,018,826 | 1/1962 | Sandiford | 166/307 X |
| 3,142,335 | 7/1964 | Dill | 252/8.55 X |
| 3,428,558 | 2/1969 | Murphy | 252/363.5 X |
| 4,167,214 | 9/1979 | Street | 252/8.55 X |
| 4,240,505 | 12/1980 | Swanson | 166/307 X |

OTHER PUBLICATIONS

*The Condensed Chemical Dictionary*, Ninth Edition, 1977, pp. 77 and 346.
*Polox, Water Soluble Resins are Unique*, Publication by Union Carbide Corp., 3/81.
Stratta, "Polyox Poly(ethylene Oxide) Resins, The Thickening of Acids and Other Cleaning Formulations," Technology Series No. 45-T-5. Pub. by Union Carbide, 3/70.

*Primary Examiner*—Herbert B. Guynn
*Attorney, Agent, or Firm*—L. W. White

[57] ABSTRACT

The permeability of siliceous or calcareous subterranean formations adjacent a wellbore is increased by contacting the formation with a gelled aqueous acid capable of dissolving mineral constituents in the formation. The gelled aqueous acid compositions comprise (a) aqueous hydrochloric acid, and (b) a readily soluble gelling agent. Component (b) contains a sufficient amount of a polyoxyethylene glycol to gel the acid and enough ammonium-, alkali-, or alkaline earth metal bicarbonate or carbonate to cause rapid dissolution and dispersion of the polyoxyethylene glycol in the aqueous hydrochloric acid.

14 Claims, No Drawings

METHOD OF ACIDIZING WELLS USING GELLED ACIDS

BACKGROUND OF THE INVENTION

1. Field of the Invention

This invention pertains to an improved process for acidizing subterranean formations surrounding a wellbore to increase the permeability thereof. This invention also pertains to novel gelled acid compositions useful in said process and to a process of making such gelled acid compositions.

2. Description of the Prior Art

"Acidizing" is a term applied to a variety of processes in which an acid is used to increase the permeability of a subterranean formations penetrated by a wellbore. The acids dissolve one or more components of the subterranean formation and thereby increase the overall permeability of the formation. The types of acids used in the general processes have been summarized in the book "Acidizing Fundamentals," edited by B. B. Williams et al., Monograph Vol. 6, Henry L. Doherty Series, published by the Society of Petroleum Engineers of AIME, New York (1979). The text indicates that the normally used acidizing techniques fall broadly into three categories: acid washing, matrix acidizing, and acid fracturing.

In matrix acidizing, acid is injected into the formation at a pressure below which a fracture is formed. Matrix acidizing treatments generally are thought to give radial acid penetration into the formation. This technique is often used where acid fracturing cannot be risked because of possible damage to a shale break or other natural flow boundry which must be maintained in order to minimize or prevent water or gas production.

Acid fracturing is a generic term for techniques in which the acid is injected into the formation at a pressure high enough to create or extend a fracture into the formation. The acid reacts with the formation as it opens up the fracture and provides a conductive flow channel when the treatment is complete. The length of the fractures created and the degree of fracture conductivity is determined in large part by the rate at which the acid spins (i.e. the rate at which the acid reacts with dissolvable components in the formation) and the rate of fluid loss from the fracture to the formation.

Gelled acids have been used to retard the reaction rate of the acid with the formation in acid fracturing treatments. One theory is that the reduced reaction rates is a result of the increased fluid viscosity which reduces the rate of acid transferred to the fracture wall. Various polymers have been used to create the acid gels. Typically, prior art gelling agents are of limited value because they tend to degrade rapidly in acid solutions at temperatures exceeding about 130° F. As a result of this, such gelled acids are not viable in deep high temperature wells. In addition, conventional acid gelling agents have typically been ineffective in gelling the more concentrated acids, e.g. hydrochloric acid at a concentration of about 20 to about 28 percent by weight.

The gelling agent is described by Parks in U.S. Pat. No. 3,236,305 is probably the most effective gelling agent used to date. Parks teaches that xanthan gum, a biopolymer, is an acid gelling agent and he also teaches how to use the thickened acid in the treatment of subterranean formations. A wide variety of other polymers have been included in acid fluids for well treatments as illustrated by:

U.S. Pat. No. 3,434,971 (Atkins) Copolymers of Acrylamide and N-Vinylpyrrolidone Crosslinked with Difunctionalolefinic Crosslinkers.

U.S. Pat. No. 3,924,684 (Tate) Poly (N-Vinyl pyrrolidone).

U.S. Pat. No. 3,791,446 (Tate) Poly (N-Vinyl pyrrolidone).

U.S. Pat. No. 3,974,077 (Free) Galactomannan Gums and Derivatives Thereof.

U.S. Pat. No. 3,548,945 (Gidley) Low Molecular Weight Aliphatic Glycol Ethers.

U.S. Pat. No. 3,475,334 (Boudreaux) a Dialdehyde Surface Treated Cellulose Ether (e.g. Glyoxal-Treated Cellulose Ethers).

U.S. Pat. No. 4,235,734 (Scherubel) Foamed Acids Stabilized with Alkanols. The term "Alkanols" includes polyoxyalkalene glycols and monoethers thereof.

U.S. Pat. No. 4,237,974 (Scherubel) certain Cellulose Derivatives and Ethylene oxide Polymers used to Thicken Pad Fluids.

U.S. Pat. No. 4,237,975 (Scherubel) Ethylene oxide Polymer Pad Fluids Preceding a Foamed Acid.

The polymers of ethylene oxide, generally referred to as polyoxyethylene glycols, are commercially available products which are obtained by a variety of polymerization processes with different molecular weights. J. J. Stratta taught in a Union Carbide trade bulletin that acids were thickened by certain polyoxyethylene glycols. The bulletin was entitled "POLYOX POLY (ETHYLENE OXIDE) RESINS, THE THICKENING OF ACIDS AND OTHER CLEANING FORMULATIONS," Union Carbide technology series number 45-T-5 (March 1970). Stratta disclosed that strong acids such as hydrochloric acid and nitric acid, are thickened to progressively lower viscosity levels as the concentration of acid is increased and that the formulation viscosity stability decreases with increasing molecular weight.

The higher molecular weight polyoxyethylene glycols are water soluble solids. Unfortunately, however, the higher molecular weight polymers are difficult to dissolve because of their molecular weight and because as they dissolve the aqueous solution thickens so that stirring becomes very difficult.

SUMMARY OF THE INVENTION

An improved process has been discovered for treating a silicious or calcareous formation penetrated by a wellbore to thereby increase the permeability thereof. The novel process comprises contacting the formation with an aqueous acid composition comprising (a) aqueous hydrochloric acid, and (b) a readily soluble gelling agent. Component (b) is a gelling agent which contains a sufficient amount of a polyoxyethylene glycol to gel the acid and enough ammonium-, alkali or alkaline earth metal bicarbonate or carbonate to cause rapid dispersion and dissolution of the polyoxyethylene glycol in the aqueous hydrochloric acid. The aqueous acid composition is also new, as is the process of gelling aqueous hydrochloric acid using the gelling agent defined by (b) above.

DETAILED DESCRIPTION OF THE INVENTION

The acid used in the present invention is hydrochloric acid. The strength of the acid can vary from dilute to concentrated (i.e. about 37%) hydrochloric acid in water. In most instances, acid strengths will be used in the range from about 3% to about 30% and will, in many instances preferably range from about 20% to about 28% hydrochloric acid and water.

The gelling agent, (b), used in the present invention comprises two components. The first component is a polyoxyethylene glycol. Such polymers are derived by polymerization of ethylene oxide in the presence of a suitable initator according to conventional techniques. The polymers have an approximate average molecular weight of at least about 250,000. Preferred polymers have an average approximate molecular weight of from about 500,000 to about five million, and the more preferred polymers have an average molecular weight of from about 700,000 to about three million. The approximate weight average molecular weights of these polymers is derived from conventional rheological measurements. For example, molecular weights of such polymers have been determined using a Brookfield viscometer to measure the viscosity of a dilute (e.g. 0.5 to 1.0 weight percent) solution of the polymer and comparing the resulting viscosity against standardized curves. This technique of determining molecular weights for polyoxyethylene glycols is a standard in the industry and well known to the skilled artisan. The polyoxyethylene glycols used herein are all nonionic, water-soluble polymers with the backbone comprised of repeating units of the formula:

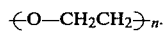

$-(O-CH_2CH_2)_n-$.

The polymers, because of their very high molecular weight, are solids. It is exceedingly difficult to dissolve these polymers in water, normally, because they form very viscous solutions which are difficult to stir. As a result, "fish-eyes" or lumping has been a common problem. Practice of the present invention eliminates or substantially eliminates such formulation problems.

The present invention includes as the second component of the gelling agent an acid-soluble bicarbonate or carbonate salt. Such salts are typically ammoniumalkali-, or alkaline earth metal bicarbonates or carbonates. Examples of suitable such salts include ammonium carbonate, sodium bicarbonate, sodium carbonate, calcium carbonate, and the like. These salts are also solids and are conveniently blended with the polyoxyethylene glycol to form a novel, stable, solid mixture which can be stored in suitable packaging and conveyed to the job site; for example, the solid mixture can be stored and shipped in bags.

The solid mixture of polyoxyethylene glycol and bicarbonate or carbonate salt is usually added to the aqueous hydrochloric acid. The polyoxyethylene glycol rapidly dissolves or disperses into the hydrochloric acid.

The amount of gelling agent used to gel the aqueous hydrochloric acid can be varied depending upon the viscosity desired. Normally the gelling agent is used in amounts sufficient to provide from about 5 pounds to about 100 pounds of polyoxyethylene glycol per 1000 gallons of formulated gelled acid. The bicarbonate or carbonate salt is be included in the gelling agent in an amount sufficient to cause rapid dispersion or solution of the polyoxyethylene glycol in the aqueous acid. This is easily determined in a laboratory by blending various amounts of the particular bicarbonate or carbonate salt with the particular polyoxyethylene glycol chosen by the artisan and adding the solid mixture to an aqueous hydrochloric acid having an acid strength as chosen by the skilled artisan. Typically, amounts of from about 0.01 pounds to about 0.5 pounds of bicarbonate or carbonate salt are used per pound of polyoxyethlene glycol. Also, it has been found advantageous to use a slight excess of the bicarbonate or carbonate salt in field operations to provide for the possible variances in polymer molecular weights, etc. A slight excess of the bicarbonate or carbonate salt is not detrimental and can be advantageous under operating conditions.

A variety of additives can be included in the gelled acid. For example, the trade literature suggests that a variety of aliphatic alcohols, such as allyl alcohol, isopropanol, ethanol, ethylene glycol, etc. or trace amounts of manganous salts, or even a combination of thiourea and diethylenetriamine or ethylenediaminetetraacetic acid can be used in aqueous solutions to stabilize the polyoxyethylene glycol against degradation and subsequent viscosity loss. Such additives can likewise be included, if desired, in the present gelled acid compositions. More importantly, iron control agents, such as the sodium salts of ethylenediaminetetraacetic acid, ascorbic acid, erythorbic acid, or soluble salts thereof, can advantageously be included in the gelled acid compositions. Of these, ascorbic acid, erythorbic acid, and soluble salts of such acids are preferred and sodium erythorbate is most preferred based upon its cost, commercial availability, and performance. Such iron control additives can be added directly to the acid prior to addition of the gelling agent or in any other convenient manner. For example, sodium erythorbate (or ascorbate) is a solid and as such it can be dry blended with the solid mixture of polyoxyethylene glycol and bicarbonate or carbonate salts.

The procedural steps of using the novel gelled acid compositions in acidizing a well are well known and differ primarily in the use of the present gelled acids instead of previous gelled acids.

EXPERIMENTAL

The following examples will further illustrate the invention:

EXAMPLE 1

Preparation of Gelled Acid

A solid mixture of gelling agent was prepared by dry blending 75 parts of a polyoxyethylene glycol (Union Carbide—POLYOX ®WSR-301; molecular weight about 4,000,000), 12.5 parts of finely divided calcium carbonate, and 12.5 parts of sodium eryorthorbate. All "parts" are parts by weight.

The solid gelling agent thus prepared gels aqueous hydrochloric acid in a wide range of concentrations (e.g. 5%, 15%, 20%, and 28%). The gelling agent disperses and dissolves rapidly in the acid in each instance.

EXAMPLE 2

Fracture Acidizing Treatment

A gelled hydrochloric acid fluid was prepared by dissolving 80 pounds of gelling agent (per Example 1) and about 2 to 3 gallons of a commercial amine-based acid inhibitor in sufficient 20 percent hydrochloric acid to make up 1000 gallons of formulated fluid. A well in Hockley County, Texas was then acidized by pumping approximately 10 barrels of water at a rate of 1 barrel per minute (bpm) at 700 to 1000 psi tubing pressure to establish injectivity and then pumping sequentially 36 barrels of 20 percent hydrochloric acid, 36 barrels of 20 percent gelled hydrochloric acid (prepared as noted above), and 20 barrels of flush water; all pumped at a rate of 1 bpm and 1600 psi tubing pressure.

The gelled acid was easy to prepare and easy to pump. The acid treatment was considered a success in terms of handling/process steps and acid treatment results. The well was returned to service after an appropriate shut-in with an increased flow of formation fluids.

EXAMPLE 3-8

Effect of Iron Control Agents on Stability

A base solution was prepared by dissolving 0.7 weight percent of the solid gelling agent from Example 1 and 0.1 weight percent of the iron control agent in 28 percent hydrochloric acid. The gelled acid was then maintained at 75° F. for 4 hours and the viscosity of the gelled acid measured periodically with a Fann Model 35 viscometer at 511 reciprocal seconds. The results are summarized in Table I.

TABLE I

| | | VISCOSITY (cps) | | | | |
|---|---|---|---|---|---|---|
| Ex. | Additive | 15' | 30' | 60' | 120' | 240' |
| 3 | None | 25.4 | 20.4 | 15.8 | 12.6 | 9.8 |
| 4 | Citric Acid | 19.4 | 17.8 | 15.0 | 13.0 | 10.4 |
| 5 | Na$_4$ EDTA* | 28.2 | 25.6 | 23.4 | 19.6 | 14.8 |
| 6 | Ascorbic Acid | 60.0 | 64.0 | 60.0 | 42.0 | 31.0 |
| 7 | Erythorbic Acid | 59.0 | 64.0 | 56.0 | 38.4 | 30.4 |
| 8 | Na Erythorbate** | 58.0 | 65.0 | 61.0 | 44.0 | 32.6 |

*Na$_4$ EDTA is tetrasodium ethylenediaminetetraacetic acid.
**Na Erythorbate is sodium erythorbate.

While all of these gelled acid formulations are excellent gels useful in acidizing treatments of wells, notice the tremendous increase in viscosity and the stability of the formulations in Example 6-8 having ascorbic acid, erythorbic acid or sodium erythorbate in them. Even after 4 hours (i.e. 240'), the gels had viscosities greater than the 15 minute viscosity of the gel without an acid control agent. Such an increased viscosity is highly beneficial.

What is claimed is:

1. In the process of treating a siliceous or calcareous formation penetrated by a wellbore to increase the permeability thereof wherein said process comprises contacting said formation with an aqueous acid capable of dissolving mineral constituents of said formation, the improvement comprising using as said aqueous acid a composition comprising:
   (a) aqueous hydrochloric acid,
   (b) a readily soluble gelling agent which contains a gelling amount of polyoxyethylene glycol having an average molecular weight of at least about 250,000 and enough ammonium-, alkali-, or alkaline earth metal bicarbonate or carbonate to cause rapid dispersion and dissolution of said polyoxyethylene glycol in (a), and
   (c) a compatible iron control agent dissolved therein, wherein said agent is ascorbic acid, erythorbic acid and/or a soluble salt thereof.

2. The process defined by claim 1 wherein said iron control agent is sodium erythorbate.

3. The process defined by claims 1 or 2 wherein said aqueous acid composition additionally comprises a compatible acid corrosion inhibitor.

4. The process defined by claim 1 wherein said bicarbonate or carbonate is calcium carbonate, sodium bicarbonate or sodium carbonate.

5. The process defined by claim 1 wherein (a) has an acid strength of from about 20 to about 30 percent.

6. A process for thickening aqueous hydrochloric acid comprising blending said aqueous acid with a readily soluble gelling agent which contains a gelling amount of polyoxyethylene glycol having an average molecular weight of at least about 250,000 and enough ammonium-, alkali-, or alkaline earth metal bicarbonate or carbonate to cause rapid dispersion and dissolution of said polyoxyethylene glycol in said acid and, an iron control agent dissolved therein said agent being ascorbic acid erythorbic acid and/or a soluble salt thereof.

7. The process defined by claims 1 or 6 wherein said polyoxyethylene glycol has an average molecular weight of from about 500,000 to about 5 million.

8. The process defined by claims 1 or 6 wherein said polyoxyethylene glycol has an average molecular weight of from about 700,000 to about 3 million.

9. A gelled acid composition comprising (a) aqueous hydrochloric acid (b) a readily soluble gelling agent which contains a gelling amount of a polyoxyethylene glycol having an average molecular weight of at least about 250,000 and enough ammonium-, alkali-, or alkaline earth metal bicarbonate or carbonate to cause rapid dispersion and dissolution of said polyoxyethylene glycol in (a) and (c) an iron control agent dissolved therein, said agent being ascorbic acid, erythorbic acid and/or a soluble salt thereof.

10. A solid mixture comprising a polyoxyethylene glycol having an average molecular weight of at least about 250,000, ammonium-, alkali-, or alkaline earth metal bicarbonate or carbonate and as an iron control agent the sodium salt of ascorbic and/or erythorbic acid.

11. The solid mixture defined by claim 10 wherein said bicarbonate or carbonate is sodium bicarbonate, sodium carbonate or calcium carbonate.

12. The solid mixture defined by claims 10 or 11 wherein said iron control agent is sodium erythorbate.

13. The composition defined by claims 9 or 10 wherein said polyoxyethylene glycol has an average molecular weight of from about 500,000 to about 5 million.

14. The composition defined by claims 9 or 10 wherein said polyoxyethylene glycol has an average molecular weight of from about 700,000 to about 3 million.

* * * * *